(12) United States Patent
Choi et al.

(10) Patent No.: US 11,171,515 B2
(45) Date of Patent: *Nov. 9, 2021

(54) WIRELESS POWER TRANSCEIVER AND DISPLAY APPARATUS WITH THE SAME

(71) Applicant: SAMSUNG ELECTRONICS CO., LTD., Suwon-si (KR)

(72) Inventors: Young-ho Choi, Suwon-si (KR); Young-Joon Kim, Yongin-si (KR); Rangarajan Jegadeesan, Seoul (KR); Sang-min Lim, Yongin-si (KR); Moon-young Kim, Hwaseong-si (KR); Yun-kwon Park, Dongducheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,002

(22) Filed: Feb. 28, 2020

(65) Prior Publication Data

US 2020/0204001 A1 Jun. 25, 2020

Related U.S. Application Data

(63) Continuation of application No. 15/942,055, filed on Mar. 30, 2018, now Pat. No. 10,581,278.

(Continued)

(30) Foreign Application Priority Data

Sep. 5, 2017 (KR) .................. 10-2017-0113554

(51) Int. Cl.
*H02J 50/12* (2016.01)
*H01F 38/14* (2006.01)
(Continued)

(52) U.S. Cl.
CPC .............. *H02J 50/12* (2016.02); *H01F 27/24* (2013.01); *H01F 27/28* (2013.01); *H01F 38/14* (2013.01);
(Continued)

(58) Field of Classification Search
CPC .. H02J 50/12; H02J 50/10; H02J 50/40; H02J 50/50; H01F 27/24; H01F 27/28; H01F 38/14; H04R 1/025; H04R 2420/07
See application file for complete search history.

(56) References Cited

U.S. PATENT DOCUMENTS 9,558,882 B2    1/2017  Chiyo et al.
10,581,278 B2 * 3/2020  Choi ...................... H01F 27/38
(Continued)

FOREIGN PATENT DOCUMENTS

CA      2 752 573 A1    8/2010
CN      104682573 A     6/2015
(Continued)

OTHER PUBLICATIONS

International Search Report (PCT/ISA/210) dated Jun. 12, 2018, issued by the International Searching Authority in counterpart International Application No. PCT/KR2018/002575.
(Continued)

*Primary Examiner* — Robert L Deberadinis
(74) *Attorney, Agent, or Firm* — Sughrue Mion, PLLC

(57) ABSTRACT

Provided is a wireless power transceiver including a magnetic body, a solenoid coil wound with respect to the magnetic body, and a dual coil spaced downwardly from the solenoid coil and wound with respect to the magnetic body on opposite sides of the solenoid coil, the dual coil being wound in directions opposite to each other.

10 Claims, 21 Drawing Sheets

Related U.S. Application Data

(60) Provisional application No. 62/548,586, filed on Aug. 22, 2017.

(51) Int. Cl.
*H01F 27/24* (2006.01)
*H01F 27/28* (2006.01)
*H02J 50/40* (2016.01)
*H02J 50/50* (2016.01)
*H02J 50/10* (2016.01)
*H04R 1/02* (2006.01)

(52) U.S. Cl.
CPC .............. *H02J 50/10* (2016.02); *H02J 50/40* (2016.02); *H02J 50/50* (2016.02); *H04R 1/025* (2013.01); *H04R 2420/07* (2013.01)

(56) References Cited

U.S. PATENT DOCUMENTS

| | | |
|---|---|---|
| 2011/0198940 A1 | 8/2011 | Urano |
| 2012/0074899 A1 | 3/2012 | Tsai et al. |
| 2012/0091795 A1 | 4/2012 | Fiorello et al. |
| 2013/0285604 A1 | 10/2013 | Partovi |
| 2014/0002228 A1 | 1/2014 | Hatanaka et al. |
| 2015/0145339 A1 | 5/2015 | Chiyo et al. |
| 2016/0156215 A1 | 6/2016 | Bae et al. |
| 2017/0179773 A1 | 6/2017 | Kim et al. |
| 2018/0219425 A1 | 8/2018 | Choi et al. |

FOREIGN PATENT DOCUMENTS

| | | |
|---|---|---|
| CN | 105516039 A | 4/2016 |
| EP | 2 884 504 A1 | 6/2015 |
| EP | 3029799 A1 | 6/2016 |
| JP | 2015-106938 A | 6/2015 |
| KR | 10-1403596 B1 | 6/2014 |
| KR | 10-2014-0147518 A | 12/2014 |
| KR | 10-1678640 B1 | 11/2016 |
| KR | 10-2017-0040031 A | 4/2017 |
| KR | 10-1745411 B1 | 6/2017 |
| KR | 10-2018-0089763 A | 8/2018 |

OTHER PUBLICATIONS

Written Opinion (PCT/ISA/237) dated Jun. 12, 2018, issued by the International Searching Authority in counterpart International Application No. PCT/KR2018/002575.

Communication dated Jun. 30, 2020, issued by the European Patent Office in European Application No. 18847844.0.

Communication dated Apr. 2, 2021, issued by the China National Intellectual Property Administration in Chinese Application No. 201880050837.3.

Xueliang et al., "Review and Research Progress on Wireless Power Transfer Technology," Transactions of China Electrotechnical Society, vol. 28, No. 10, Oct. 2013, Total 11 pages.

* cited by examiner

WIRELESS POWER TRANSCEIVER AND DISPLAY APPARATUS WITH THE SAME

CROSS-REFERENCE TO RELATED APPLICATIONS

This application is a continuation of U.S. application Ser. No. 15/942,055, filed Mar. 30, 2018 which is based on and claims priority under 35 U.S.C. § 119(e) from U.S. Provisional Application No. 62/548,586 filed on Aug. 22, 2017, in the United States Patent & Trademark Office, and is based on and claims priority under 35 U.S.C. § 119(a) from Korean Patent Application No. 10-2017-0113554 filed on Sep. 5, 2017, in the Korean Intellectual Property Office, the disclosures of both of which are incorporated herein by reference in their entirety.

BACKGROUND

1. Field

The disclosure relates to a wireless power transceiver. More particularly, the disclosure relates to a wireless power transceiver that can be used in a thin display apparatus.

2. Description of Related Art

In order to utilize a living space more efficiently, an increasing number of users want to use a display apparatus, for example, a television (TV), in the form of a wall-mounted TV.

Generally, wall-mounted TVs are disposed on the upper portion of a wall spaced apart from the floor of the room or a cabinet. In this case, the power line connected to the wall-mounted TV may be exposed, which may degrade the aesthetics of the TV.

To solve this problem, a wireless power transmission method for wirelessly supplying power to the wall-mounted TV is being developed.

For example, implementing a wireless power receiver with a coil of a wide shape may be advantageous for wireless power transmission. However, considering that the thickness of a display apparatus has recently become thinner, there is a problem that a wireless power receiver formed with a wide coil may not be disposed inside a display apparatus.

Accordingly, there is a need to develop a wireless power transceiver capable of being disposed in a thinner display apparatus and capable of having a higher power receiving efficiency.

SUMMARY

In accordance with an aspect of the disclosure, a wireless power transceiver may be applied to a thinner display apparatus and may have a higher wireless power receiving efficiency, and a display system include the wireless power transceiver.

In accordance with an aspect of the disclosure, there is provided a wireless power transceiver including a magnetic body formed in a rod shape and including a groove in a middle portion of the magnetic body, a solenoid coil wound around the middle portion of the magnetic body in which the groove is provided, and a dual coil disposed substantially perpendicular to the solenoid coil and wound around portions on both sides of the groove of the magnetic body, the dual coil being wound in directions opposite to each other.

The solenoid coil and the dual coil may be physically connected in series.

The solenoid coil and the dual coil may be physically separated, and coupled to each other by a magnetic field.

The magnetic body may include two legs on opposite sides of the groove, and the dual coil may be wound around the two legs of the magnetic body, respectively, in a spiral shape.

The dual coil may include a plurality of spiral coil layers, a plurality of insulators interposed between the plurality of spiral coil layers, and a plurality of capacitors connected in series to the plurality of spiral coil layers.

The magnetic body may include two legs on opposite sides of the groove, and the dual coil may be wound around the two legs of the magnetic body, respectively, in a helical shape.

The wireless power transceiver may further include a power source connected to both ends of the solenoid coil, wherein the dual coil is configured to operate as a repeater.

The wireless power transceiver may further include a power source connected to both ends of the dual coil, wherein the solenoid coil is configured to operate as a repeater.

The magnetic body may include a first magnetic body in which the solenoid coil is wound around a middle portion of the first magnetic body, a second magnetic body disposed on the first magnetic body at one side of the solenoid coil, wherein one portion of the dual coil is wound around the second magnetic body, and a third magnetic body disposed on the first magnetic body at another side of the solenoid coil and spaced apart from the second magnetic body, wherein another portion of the dual coil is wound around the third magnetic body.

The wireless power transceiver, wherein a length of the magnetic body may be at least five times greater than a width or a thickness of the magnetic body.

In accordance with another aspect of the disclosure, there is provided a wireless power transceiver including a magnetic body, a main coil disposed on a upper side of the magnetic body, the main coil including a first main coil portion which is disposed at one side with respect to a middle portion of the magnetic body and wound in one direction, and a second main coil portion which is disposed at another side, adjacent to the one side, with respect to the magnetic body and wound in a direction opposite to the first main coil portion, and an auxiliary coil disposed between the magnetic body and the main coil, the auxiliary coil including a first auxiliary coil part disposed below the first main coil portion and a second auxiliary coil part disposed below the second main coil portion.

The wireless power transceiver, wherein each of the first auxiliary coil part and the second auxiliary coil part may include at least two sub auxiliary coil parts.

The wireless power transceiver, wherein the main coil and the auxiliary coil are physically connected in series, and wherein a capacitor is physically connected in series with each of the main coil and the auxiliary coil.

The wireless power transceiver, wherein the main coil and the auxiliary coil may be physically separated, and coupled to each other by a magnetic field.

The wireless power transceiver, wherein coil receiving grooves configured to receive the main coil and the auxiliary coil may be formed on an upper surface of the magnetic body in contact with the main coil and the auxiliary coil.

In accordance with another aspect of the disclosure, there is provided a display system including a display apparatus, a wireless power receiver configured to supply power to the display apparatus, and a wireless power transmitter configured to generate a magnetic field to pass through the wireless power receiver, wherein the wireless power receiver includes a solenoid coil in which a current is induced by a magnetic field component of the magnetic field passing through the wireless power receiver in a horizontal direction, and a dual coil disposed substantially perpendicular to the solenoid coil and wound on both sides of the solenoid coil below the solenoid coil in directions opposite to each other, the dual coil in which a current is induced by a magnetic field component of the magnetic field passing through the wireless power receiver in a vertical direction.

The display system, wherein the display apparatus may include a display panel, wherein the dual coil of the wireless power receiver is wound in a spiral shape, and wherein the wireless power receiver is disposed on a rear surface of the display panel, and a side surface of the dual coil is exposed to a front side of the display apparatus below a lower end of the display apparatus.

The display system, wherein the display apparatus may include a display panel and a metal plate provided on a rear surface of the display panel, wherein the dual coil of the wireless power receiver is wound in a helical shape, and wherein the metal plate of the display apparatus includes an opening corresponding to the wireless power receiver, and the wireless power receiver is disposed in the opening of the metal plate.

The display system may further include speakers disposed at both ends of the wireless power receiver, and wherein sound passage holes configured to emit sound from the speakers are disposed at both ends of a magnetic body of the wireless power receiver.

The display system may further include a sound bar disposed below the display apparatus, wherein the solenoid coil and the dual coil are physically separated, and wherein the solenoid coil is disposed at a lower end of a rear surface of the display apparatus, and the dual coil is disposed in the sound bar.

BRIEF DESCRIPTION OF THE DRAWINGS

The above and other aspects, features and advantages of certain embodiments of the present disclosure will become more apparent from the following description, taken in conjunction with the accompanying drawings, in which.

DETAILED DESCRIPTION OF EMBODIMENTS

Figure 1:
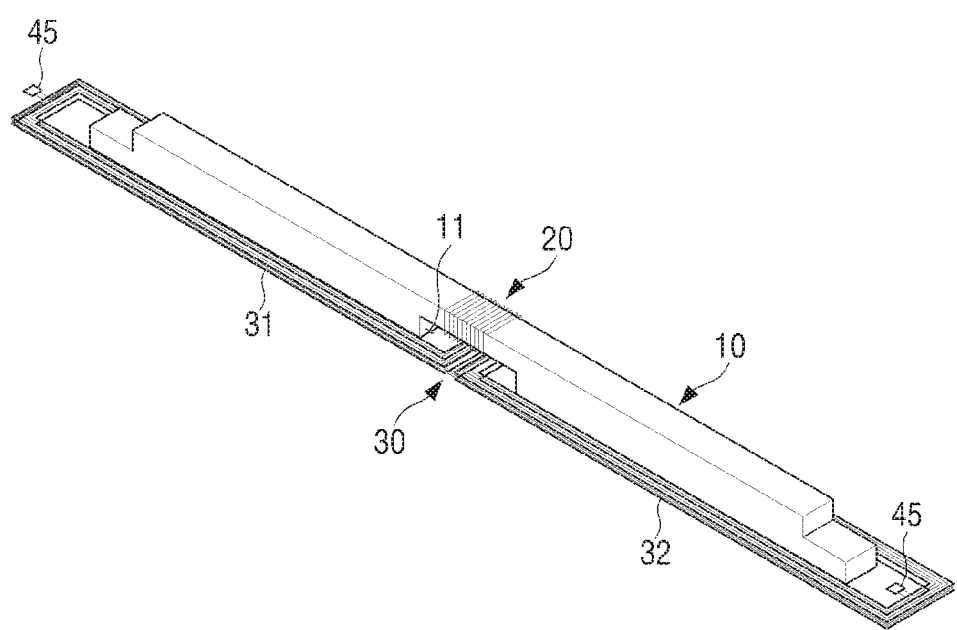
FIG. 1 is a perspective view illustrating a wireless power transceiver according to an embodiment.

Hereinafter, certain embodiments of the present disclosure will be described in detail with reference to the accompanying drawings.

The matters defined herein, such as a detailed construction and elements thereof, are provided to assist in a comprehensive understanding of this description. Thus, it is apparent that embodiments may be carried out without those defined matters. Also, well-known functions or constructions are omitted to provide a clear and concise description of embodiments. Further, dimensions of various elements in the accompanying drawings may be arbitrarily increased or decreased for assisting in a comprehensive understanding.

Like reference numerals or symbols shown in the drawings of the present disclosure may indicate components or components that may perform substantially the same function.

As used herein, the terms "first" and "second" may use corresponding components regardless of importance or order and are used to distinguish a component from another without limiting the components.

As used herein, the term "and/or" includes any and all combinations of one or more of the associated listed items. Expressions such as "at least one of" or "at least one from among" when preceding a list of elements, modify the entire list of elements and do not modify the individual elements of the list. For example, the expression, "at least one from among a, b, and c," should be understood as including only a, only b, only c, both a and b, both a and c, both b and c, or all of a, b, and c.

Terms such as "above," "below," "rear," "front," etc., which are used in the following description are defined based on embodiments as shown in the drawings, but a position of each component is not limited thereto.

Figure 2:
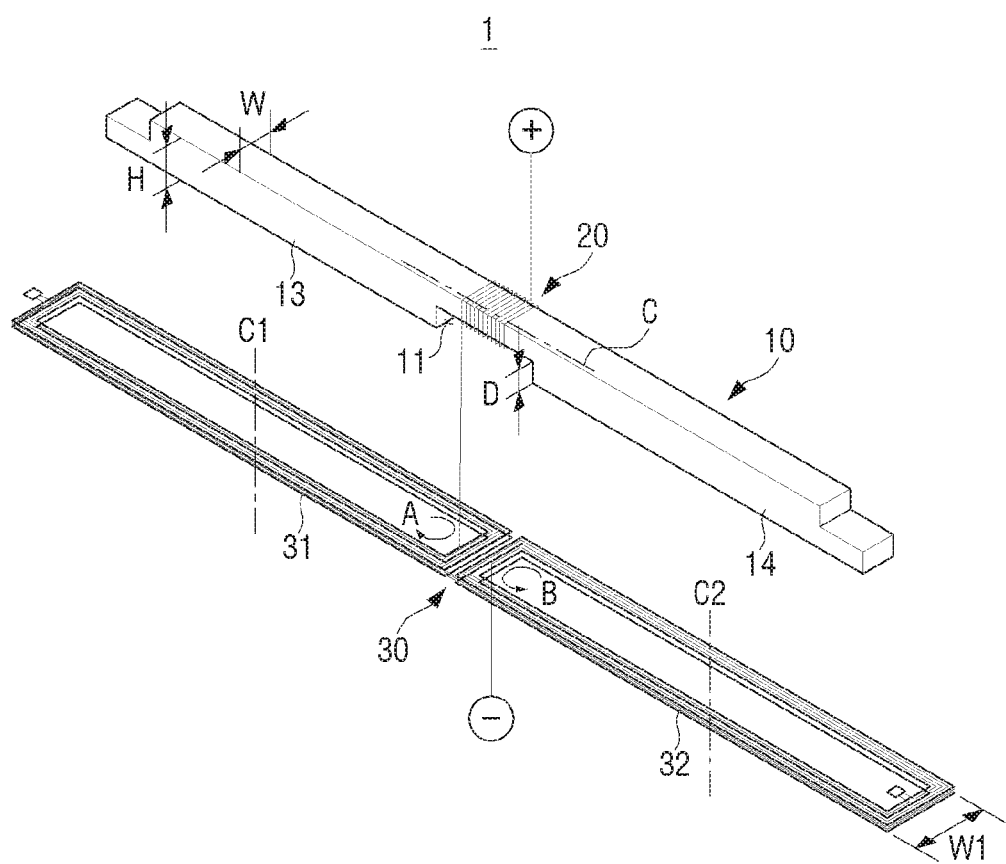
FIG. 2 is an exploded perspective view illustrating the wireless power transceiver of FIG. 1.
Figure 3:
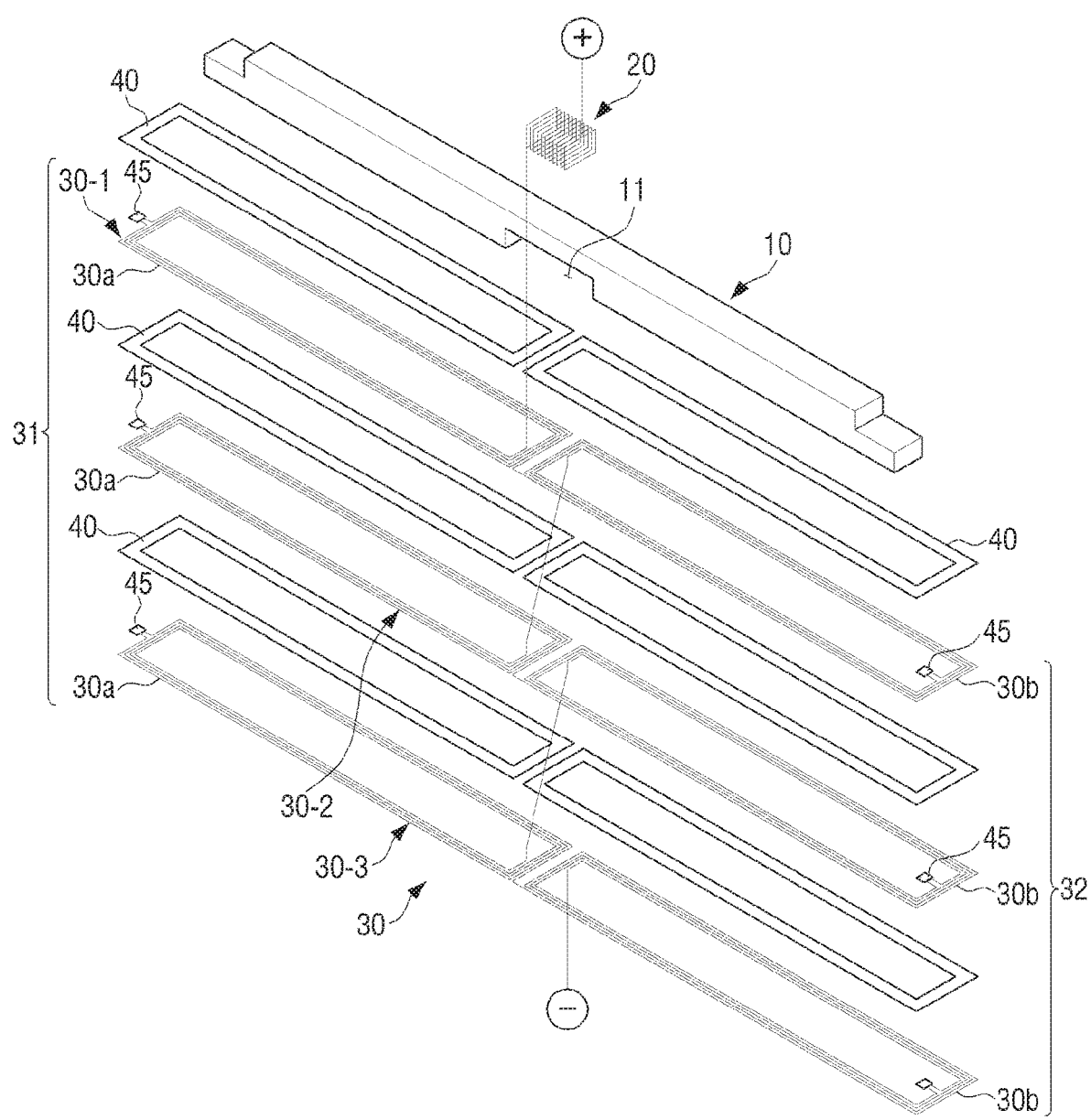
FIG. 3 is an exploded perspective view illustrating a solenoid coil of FIG. 2.

FIG. 1 is a perspective view illustrating a wireless power transceiver according to an embodiment. FIG. 2 is an exploded perspective view illustrating the wireless power transceiver of FIG. 1. FIG. 3 is an exploded perspective view illustrating a solenoid coil of FIG. 2.

Referring to FIGS. 1 to 3, a wireless power transceiver 1 according to an embodiment may include a magnetic body 10, a solenoid coil 20, and a dual coil 30.

The magnetic body 10 may be formed in a rod (or bar) shape having a length longer than the width, and a groove 11 may be formed in the middle portion of the magnetic body 10. For example, the magnetic body 10 may have a rectangular cross-section, and may be formed in a rod shape having a length of about 5 times or more as compared with the height H and the width W of the magnetic body 10. The magnetic body 10 may be formed of, for example, ferrite. The groove 11 is formed in the middle portion in the longitudinal direction of the magnetic body 10. The depth D of the groove 11 may be formed to be approximately half of the height H or the width W of the magnetic body 10. The width of the groove 11 may be formed to have a size capable of winding the solenoid coil 20.

The solenoid coil 20 is formed by winding a conductive wire in the middle portion of the magnetic body 10. In detail, the solenoid coil 20 is formed by winding the conductive wire in the middle portion of the magnetic body 10 in which the groove 11 is formed. In other words, the solenoid coil 20 is formed by winding the conductive wire in the middle portion of the magnetic body 10 which is lower in height than the other portion.

The solenoid coil 20 may be formed by winding the conductive wire in various sectional shapes. In the embodiment illustrated in FIGS. 1 and 2, the solenoid coil 20 is wound in a substantially rectangular shape, but the sectional shape of the solenoid coil 20 is not limited thereto. For example, the solenoid coil 20 may be formed by winding the conductive wire in various shapes such as a circular shape, a triangular shape, a polygonal shape, or the like. The solenoid coil 20 allows the electric current to be induced by the magnetic force lines passing through the magnetic body 10 in the longitudinal direction of the magnetic body 10 without passing through the dual coil 30.

The dual coil 30 includes two coil portions, that is, a first coil portion 31 and a second coil portion 32, which are spaced apart from each other by a predetermined distance and are formed by the conductive wire wound around two imaginary lines C1 and C2 which are parallel to each other. The first coil portion 31 and the second coil portion 32 may be continuously formed by one conductive wire and wound in opposite directions to each other. For example, as illustrated in FIG. 2, when the first coil portion 31 is wound in the clockwise direction (in the direction of arrow A), the second coil portion 32 is wound in the counter-clockwise direction (in the direction of arrow B). Therefore, currents flows in the same direction in the portions where the first coil portion 31 and the second coil portion 32 are adjacent to each other.

The dual coil 30 may be disposed substantially perpendicular to the solenoid coil 20. In other words, the dual coil 30 may be wound on the magnetic body 10 so that the center line C1 of the first coil portion 31 and the center line C2 of the second coil portion 32 are substantially perpendicular to the center line C of the solenoid coil 20. For example, the dual coil 30 may be disposed on the portions of the magnetic body 10 located on both sides of groove 11, that is, two legs 13 and 14 of the magnetic body 10. Accordingly, the dual coil 30 may be disposed perpendicular to the solenoid coil 20 and wound in the opposite directions to each other on the portions 13 and 14 of the magnetic body 10 located on both sides of the groove 11.

The solenoid coil 20 and the dual coil 30 may be physically connected in series. For example, as illustrated in FIG. 2, the dual coil 30 and the solenoid coil 20 may be formed by using a single conductive wire. However, embodiments are not limited thereto.

Figure 6:
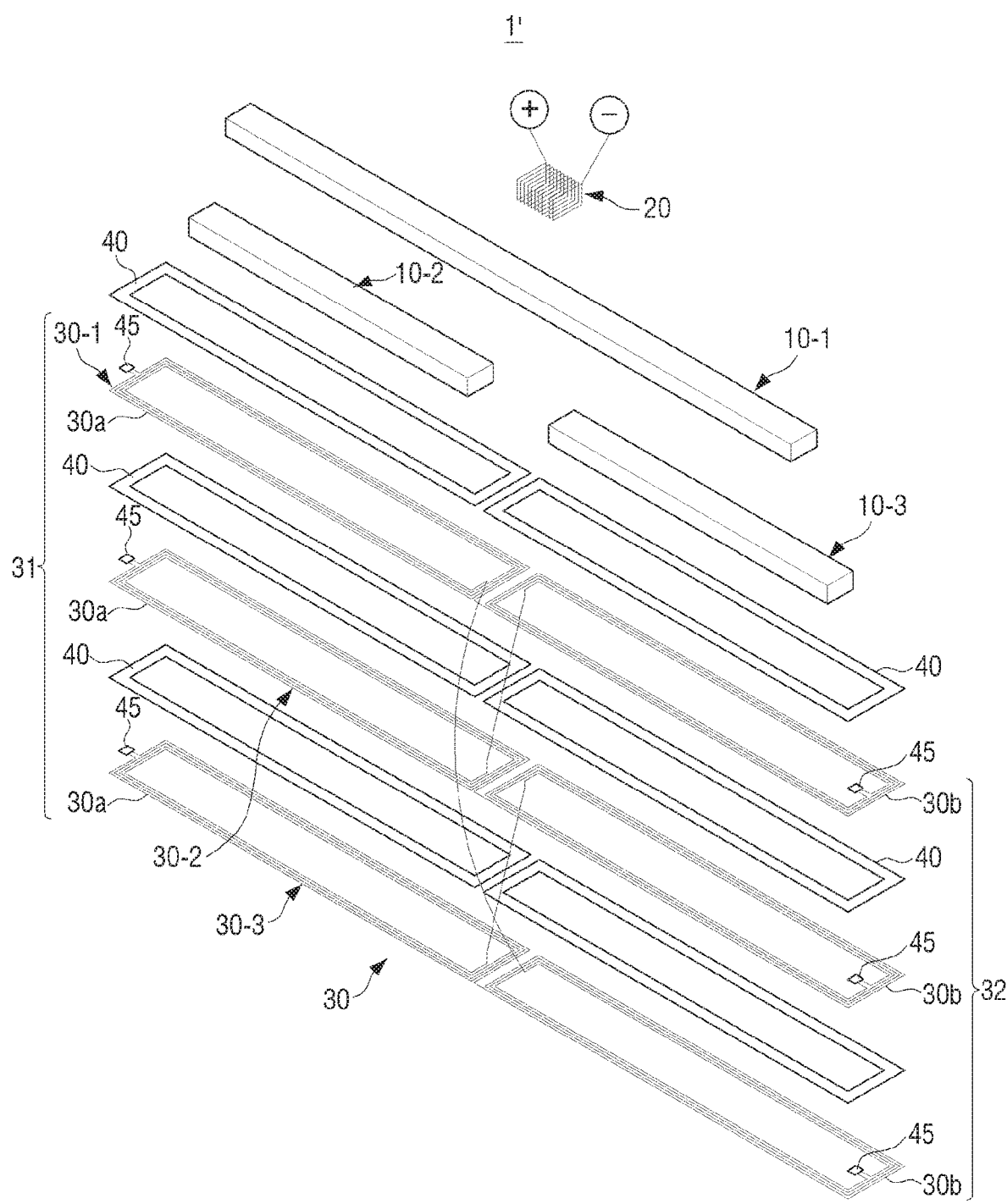
FIG. 6 is an exploded perspective view illustrating a wireless power transceiver according to an embodiment.

For example, as illustrated in FIG. 6, the solenoid coil 20 and the dual coil 30 may be separated without being physically connected. In other words, the solenoid coil 20 and the dual coil 30 may be wound around the magnetic body 10 with separate conductive wires. In this case, the solenoid coil 20 and the dual coil 30 may be disposed at a distance at which the solenoid coil 20 and the dual coil 30 are strongly coupled to each other by a magnetic field formed between the solenoid coil 20 and the dual coil 30.

When the solenoid coil 20 and the dual coil 30 are separated as described above, the solenoid coil 20 and the dual coil 30 may be structured such that they share one magnetic body 10 as illustrated in FIGS. 1 to 3. Therefore, when the wireless power transceiver 1 according to an embodiment is used as a receiving antenna, the currents induced by the amount of change of the magnetic flux passing through the solenoid coil 20 and the dual coil 30 may be combined and output. Further, when the solenoid coil 20 and the dual coil 30 are physically separated from each other, the manufacturing of the wireless power transceiver 1 may be more convenient.

According to an embodiment, the dual coil 30 may be wound on both legs 13 and 14 of the magnetic body 10 in a spiral shape or a helical shape.

When the dual coil 30 is wound in a spiral shape, the dual coil 30 may be formed in a layered structure to reduce the width W1 of the dual coil 30. FIG. 3 shows the dual coil 30 formed in a layered structure.

Referring to FIG. 3, the dual coil 30 may include a plurality of spiral coil layers 30-1, 30-2, and 30-3 stacked in the layered structure, a plurality of insulating layers 40 interposed between the plurality of spiral coil layers 30-1, 30-2, and 30-3, and a plurality of capacitors 45 connected in series to the plurality of spiral coil layers 30-1, 30-2, and 30-3, respectively.

Each of the spiral coil layers 30-1, 30-2, and 30-3 includes two spiral portions 30a and 30b in which the conductive wire is wound in a spiral shape around two imaginary points spaced apart from each other in a plane, as illustrated in FIG. 3. At this time, the two spiral portions 30a and 30b forming each of the spiral coil layers 30-1, 30-2, and 30-3 are wound in opposite directions to each other. The two stacked spiral portions 30a and 30b form the first coil portion 31 and the second coil portion 32, respectively.

Further, the spiral coil layer in one layer may be connected in series with the spiral coil layer in the next layer. For example, the final end of the conductive wire forming the first spiral coil layer 30-1 may be connected in series with the starting end of the conductive wire forming the second spiral coil layer 30-2. The starting end of the conductive wire of the first spiral coil layer 30-1 may be connected in series with the final end of the solenoid coil 20. Further, the starting end of the solenoid coil 20 and the final end of the conductive wire of the last spiral coil layer 30-3 may be connected to a rectifier of a power source 110 (see FIG. 7). In FIG. 3, + and − indicate that the conductive wires of the spiral coil layer 30-3 and the solenoid coil 20 are connected to the rectifier of the power source 110.

When the dual coil 30 is formed in a multilayer structure like the present embodiment, the voltage difference between the conductive wires forming the spiral coil layers 30-1, 30-2, and 30-3 may be larger, so there may be a need to consider ways to reduce the voltage difference. For example, when each of the spiral coil layers 30-1, 30-2, and 30-3 is formed by winding the conductive wire 20 turns (10 turns in the left spiral portion 30*a* and 10 turns in the right spiral portion 30*b*), the difference in the number of winding turns between the conductive wire forming the upper spiral coil layer 30-1 and 30-2 and the conductive wire forming the lower spiral coil layer 30-2 and 30-3 is 20 turns. The larger the difference in the number of winding turns, the greater the voltage difference is.

Therefore, in the wireless power transceiver 1 according to an embodiment, the insulator 40 may be interposed between the plurality of spiral coil layers 30-1, 30-2, and 30-3 forming the dual coil 30. Accordingly, it is possible to prevent or reduce insulation breakdown of the conductive wire caused by the voltage difference between the adjacent spiral coil layers 30-1, 30-2, and 30-3.

Further, a capacitor 45 may be connected in series to each of the plurality of spiral coil layers 30-1, 30-2, and 30-3 of the dual coil 30. The capacitor 45 may lower the high voltage across the dual coil 30 that may occur during resonance. When a resonance phenomenon occurs in the dual coil 30, the voltage between both ends of the dual coil 30 may be increased to cause insulation breakdown and cause fire. The capacitance of the capacitor 45 may be determined in consideration of the resonance frequency.

Hereinafter, another embodiment in which the dual coil being wound in a helical shape will be described with reference to FIGS. 4 and 5.

Figure 4:
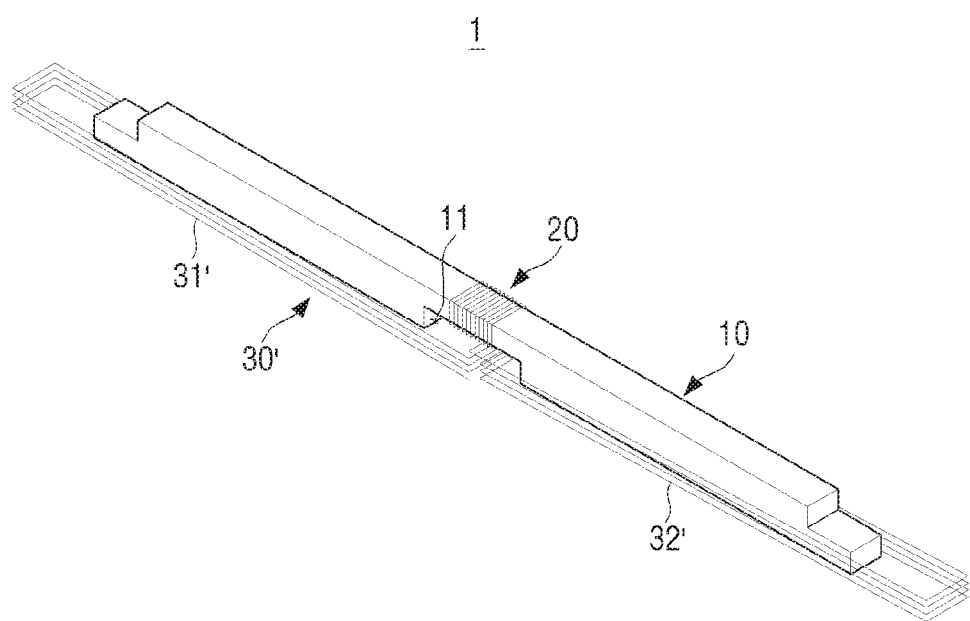
FIG. 4 is a perspective view illustrating a wireless power transceiver according to an embodiment.

FIG. 4 is a perspective view illustrating a wireless power transceiver according to an embodiment. FIG. 5 is an exploded perspective view illustrating the wireless power transceiver of FIG. 4.

Figure 5:
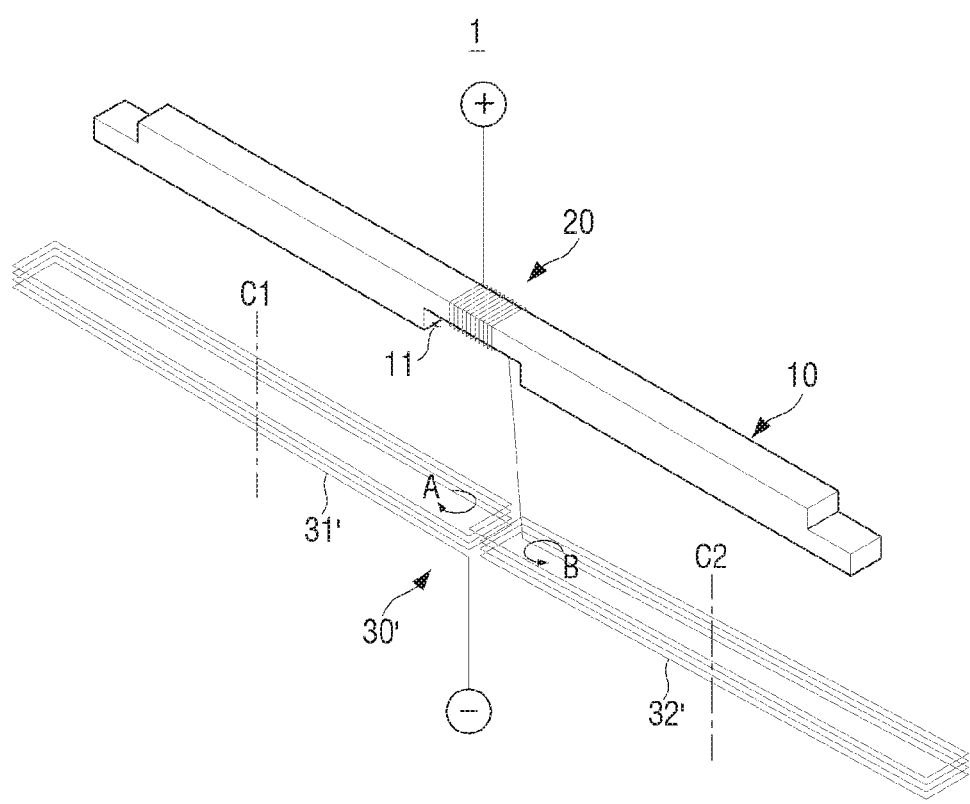
FIG. 5 is an exploded perspective view illustrating the wireless power transceiver of FIG. 4.

Referring to FIGS. 4 and 5, a wireless power transceiver 1 according to an embodiment may include a magnetic body 10, a solenoid coil 20, and a dual coil 30'.

The magnetic body 10 and the solenoid coil 20 are the same as the magnetic body 10 and the solenoid coil 20 of the wireless power transceiver 1 according to the embodiment as illustrated in FIGS. 1 to 3.

As illustrated in FIG. 4, the dual coil 30' may be wound in a helical shape on the left and right sides of the groove 11 of the magnetic body 10, that is, around both legs 13 and 14 of the magnetic body 10. In other words, as illustrated in FIG. 5, the dual coil 30' includes two helical portions 31' and 32' in which a conductive wire is wound in a helical or coil spring shape around two imaginary straight lines C1 and C2 spaced apart from each other in a plane.

The two helical portions 31' and 32' may be connected in series and wound in opposite directions to each other. For example, when the left helical portions 31' is wound in the clockwise direction (the direction of arrow A), the right helical portions 32' is wound in the counter-clockwise direction (the direction of arrow B).

Further, the final end of the conductive wire of the left helical portion 31' may be connected in series with the starting end of the conductive wire of the right helical portion 32'. The final end of the right helical portion 32' may be connected in series with the final end of the solenoid coil 20. Further, the starting end of the conductive wire of the solenoid coil 20 and the starting end of the conductive wire of the left helical portion 31' may be connected to the rectifier of the power source 110. In FIG. 5, + and − indicate that the conductive wires of the left helical portion 31' and the solenoid coil 20 are connected to the rectifier of the power source 110.

According to an embodiment, the magnetic body 10 of the wireless power transceiver 1 may be formed in a single body. However, a magnetic body on which the solenoid coil 20 is wound and a magnetic body on which the dual coil 30 is wound may be formed separately.

Hereinafter, an example where the magnetic body of the solenoid coil 20 and the magnetic body of the dual coil 30 are formed separately will be described with reference to FIG. 6.

FIG. 6 is an exploded perspective view illustrating a wireless power transceiver according to an embodiment.

Referring to FIG. 6, a wireless power transceiver 1' according to an embodiment may include a first magnetic body 10-1, a second magnetic body 10-2, a third magnetic body 10-3, a solenoid coil 20, and a dual coil 30.

The solenoid coil 20 and the dual coil 30 are the same as or similar to the solenoid coil 20 and the dual coil 30 of the wireless power transceiver 1 according to the embodiment illustrated in FIGS. 1 to 3.

The first magnetic body 10-1 may be formed in a rod shape having a length longer than the width, and the solenoid coil 20 may be wound around the middle portion of the first magnetic body 10-1 in the longitudinal direction. At this time, the solenoid coil 20 is wound along the longitudinal direction of the first magnetic body 10-1. Therefore, the center line of the solenoid coil 20 may coincide with the center line of the first magnetic body 10-1.

The second magnetic body 10-2 may be disposed on one side of the solenoid coil 20 below the first magnetic body 10-1, and the third magnetic body 10-3 may be disposed on the other side of the solenoid coil 20 at a predetermined distance from the second magnetic body 10-2 below the first magnetic body 10-1. In other words, the third magnetic body 10-3 may be disposed on the opposite side of the second magnetic body 10-2 with respect to the solenoid coil 20 as a center. According to the embodiment of the wireless power transceiver 1' as illustrated in FIG. 6, the second magnetic body 10-2 may be disposed on the left side of the solenoid coil 20, and the third magnetic body 10-3 may be disposed on the right side of the solenoid coil 20.

One portion of the dual coil 30 may be wound around the second magnetic body 10-2 and the other portion of the dual coil 30 may be wound around the third magnetic body 10-3. For example, when the dual coil 30 is wound in the spiral shape, the first coil portion 31 is wound around the second magnetic body 10-2, and the second coil portion 32 is wound around the third magnetic body 10-3.

Referring to FIG. 6, the dual coil 30 may include a plurality of spiral coil layers 30-1, 30-2, and 30-3 stacked in a layered structure, a plurality of insulating layers 40 interposed between the plurality of spiral coil layers 30-1, 30-2, and 30-3, and a plurality of capacitors 45 connected in series to the plurality of spiral coil layers 30-1, 30-2, and 30-3, respectively.

Each of the spiral coil layers 30-1, 30-2, and 30-3 may include two spiral portions 30*a* and 30*b* in which a conductive wire is wound in a spiral shape around two imaginary points spaced apart from each other on a plane as illustrated in FIG. 6. At this time, the two spiral portions 30*a* and 30*b* forming each of the spiral coil layers 30-1, 30-2, and 30-3 may be wound in opposite directions to each other. The two stacked spiral portions 30*a* and 30*b* form the first coil portion 31 and the second coil portion 32, respectively.

Further, the spiral coil layer in one layer may be connected in series with the spiral coil layer in the next layer. For example, the final end of the conductive wire forming the first spiral coil layer 30-1 may be connected in series with the starting end of the conductive wire forming the second spiral coil layer 30-2. The final end of the conductive wire forming the second spiral coil layer 30-2 may be connected in series with the starting end of the conductive wire forming the third spiral coil layer 30-3.

The dual coil 30 and the solenoid coil 20 may be physically separated from each other. In this case, one of the dual coil 30 and the solenoid coil 20 may form a closed loop, and the other may be connected to the rectifier of the power source 110 (see FIG. 7).

According to an embodiment as illustrated in FIG. 6, the dual coil 30 forms a closed loop, and both ends of the conductive wire forming the solenoid coil 20 are connected to the power source 110.

For example, the starting end of the conductive wire of the first spiral coil layer 30-1 may be connected to the final end of the conductive wire of the last spiral coil layer 30-3 to form the closed loop. In addition, the starting end and the final end of the solenoid coil 20 may be connected to the rectifier of the power source 110. In FIG. 6, + and – indicate that both ends of the solenoid coil 20 are connected to the rectifier.

When both ends of the solenoid coil 20 are connected to the rectifier of the power source 110, the dual coil 30 may operate as a repeater coil for amplifying the magnetic field.

According to an embodiment, the solenoid coil 20 may be formed as a closed loop, and both ends of the dual coil 30 may be connected to the rectifier of the power source 110. When the rectifier is connected to both ends of the dual coil 30, the solenoid coil 20 may operate as a repeater coil for amplifying the magnetic field.

As described above, when the magnetic body 10 is formed separately by the first magnetic body 10-1, the second magnetic body 10-2, and the third magnetic body 10-3, the solenoid coil 20 wound around the first magnetic body 10-1 and the dual coil 30 wound around the second magnetic body 10-2 and the third magnetic body 10-3 may be modularized. Therefore, the manufacturing of the wireless power transceiver 1' may be more convenient.

The wireless power transceiver 1 and 1' according to an embodiment may be used as a wireless power receiver for generating a current by receiving magnetic force lines emitted from a separate wireless power transmitter.

Figure 7:
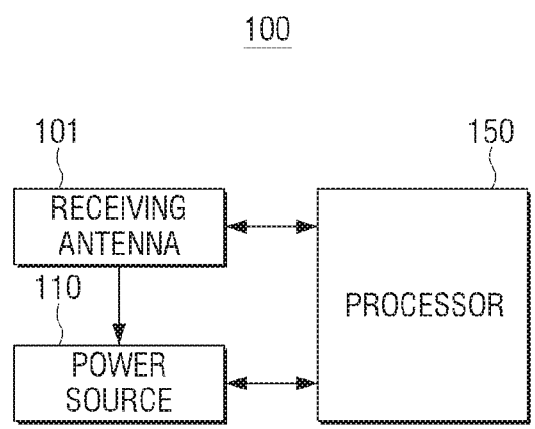
FIG. 7 is a block diagram illustrating a wireless power receiver using a wireless power transceiver according to an embodiment as a receiving antenna.

FIG. 7 is a block diagram illustrating an example in which a wireless power transceiver according to an embodiment is used as a receiving antenna of a wireless power receiver.

Referring to FIG. 7, a wireless power receiver 100 may include a receiving antenna 101, a power source 110, and a processor 150.

The receiving antenna 101 may be formed to generate a current when a magnetic field is applied. The receiving antenna 101 may be configured to allow the magnetic force lines transmitted from a transmitting antenna 202 to pass through the receiving antenna 101. The receiving antenna 101 may use the above-described wireless power transceiver 1 according to an embodiment.

The power source 110 may be configured to supply power to an external device such as a display apparatus 300 (see FIG. 14) using the current generated by the receiving antenna 101. The power source 110 may include a rectifier and convert the induced AC power into DC power.

The processor 150 may control the receiving antenna 101 and the power source 110. For example, the processor 150 may control the power source 110 to rectify the current received from the receiving antenna 101 and transmit the rectified current to the external device.

In FIG. 7, the wireless power transceiver 1 according to an embodiment may be used as the receiving antenna 101 of the wireless power receiver 100, but embodiments are not limited thereto. The wireless power transceiver 1 according to an embodiment may be used as a transmitting antenna of a wireless power transmitter.

Hereinafter, an example of a wireless power transceiver 201 that may be used as a wireless power transmitter 200 for transmitting power to the wireless power receiver 100 as described above will be described with reference to FIGS. 8 and 9.

Figure 8:
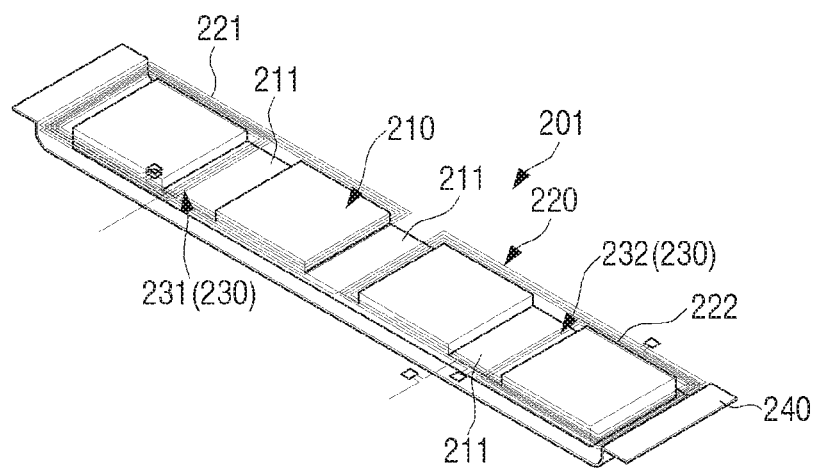
FIG. 8 is a perspective view illustrating a wireless power transceiver according to an embodiment.
Figure 9:
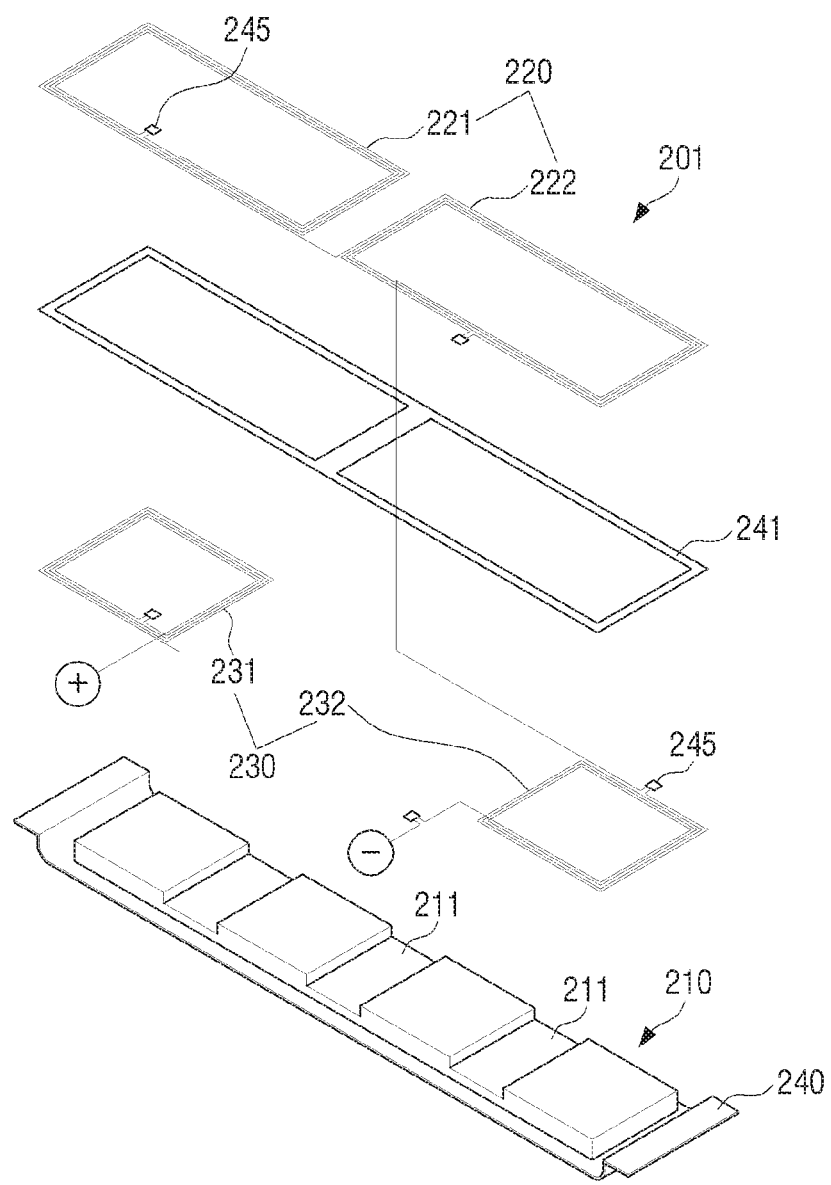
FIG. 9 is an exploded perspective view illustrating the wireless power transceiver of FIG. 8.

FIG. 8 is a perspective view illustrating a wireless power transceiver according to an embodiment, and FIG. 9 is an exploded perspective view illustrating the wireless power transceiver of FIG. 8.

Referring to FIGS. 8 and 9, a wireless power transceiver 201 according to an embodiment may include a magnetic body 210, a main coil 220, and an auxiliary coil 230.

The magnetic body 210 may be formed in a substantially plate shape. The main coil 220 and the auxiliary coil 230 may be disposed on the upper side of the magnetic body 210. The magnetic body 210 forms a passage through which the magnetic force lines formed by the main coil 220 and the auxiliary coil 230 flow. Coil receiving grooves 211 in which the main coil 220 and the auxiliary coil 230 are accommodated may be provided on the upper surface of the magnetic body 210 in contact with the main coil 220 and the auxiliary coil 230. Therefore, the main coil 220 and the auxiliary coil 230 may be provided in a form embedded in the magnetic body 210.

Further, a shielding member 240 may be provided under the magnetic body 210. The shielding member 240 may be formed to prevent or reduce the magnetic force lines generated by the main coil 220 and the auxiliary coil 230 from affecting below the magnetic body 210. An aluminum plate may be used as the shielding member 240.

The main coil 220 may be provided on the upper side of the magnetic body 210 and may include two main coil portions wound in a spiral shape, that is, a first main coil portion 221 and a second main coil portion 222. The first main coil portion 221 may be positioned on one side with respect to the middle of the magnetic body 210 and may be wound in a spiral shape in one direction. The second main coil portion 222 may be positioned on the other side with respect to the middle of the magnetic body 210 and may be wound in a spiral shape in a direction opposite to the first main coil portion 221. For example, the first main coil portion 221 and the second main coil portion 222 are formed by a conductive wire wound in a spiral shape around two imaginary points spaced apart from each other in a plane, and are connected in series with each other. Further, when the first main coil portion 221 is wound in the clockwise direction, the second main coil portion 222 is wound in the counter-clockwise direction.

The auxiliary coil 230 may be provided between the magnetic body 210 and the main coil 220 and may include two auxiliary coil parts 231 and 232, that is, a first auxiliary coil part 231 and a second auxiliary coil part 232 corresponding to the main coil 220. The first auxiliary coil part 231 may be located below the first main coil portion 221 on the upper side of the magnetic body 210. The second auxiliary coil part 232 may be located below the second main coil portion 222 on the upper side of the magnetic body 210.

However, in order to lower the height of the wireless power transceiver 201, the auxiliary coil 230 may not be arranged apart from the main coil 220, but located on substantially the same plane. In other words, the main coil 220 are auxiliary coil 230 may be provided to be in close contact with each other with the insulator 241 interposed therebetween.

Further, in order to reduce the loss of the magnetic field generated by the magnetic body 210, the main coil 220 may be disposed in the middle of the magnetic body 210 and the auxiliary coil 230 may be disposed at the left and right with respect to the main coil 220 in the middle portion. Therefore, the magnetic field generated by the wireless power transceiver 201 may be transmitted farther.

The first auxiliary coil part 231 and the second auxiliary coil part 232 of the auxiliary coil 230 may be wound in opposite directions to each other. For example, when the first auxiliary coil part 231 is wound in the clockwise direction, the second auxiliary coil part 232 is wound in the counter-clockwise direction.

The main coil 220 and the auxiliary coil 230 may be connected in series as illustrated in FIG. 9. In other words, the main coil 220 and the auxiliary coil 230 may be formed by a single conductive wire. The starting end of the first main coil portion 221 may be connected to the final end of the first auxiliary coil part 231, and the final end of the first main coil portion 221 may be connected to the starting end of the second main coil portion 222. The final end of the second main coil portion 222 may be connected to the starting end of the second auxiliary coil part 232. The starting end of the first auxiliary coil part 231 and the final end of the second auxiliary coil part 232 may be connected to a rectifier of a power source 260 (see FIG. 10). In FIG. 9, + and − indicate that the first auxiliary coil part 231 and the second auxiliary coil part 232 are connected to the rectifier of the power source 260.

In addition, since the main coil 220 and the auxiliary coil 230 are arranged in layers, a voltage difference between the conductive wires forming the main coil 220 and the auxiliary coil 230 may be larger. An insulator 241 may be interposed between the main coil 220 and the auxiliary coil 230 to prevent or reduce insulation breakdown of the conductive wire caused by the voltage difference between the main coil 220 and the auxiliary coil 230.

Further, the capacitors 245 may be connected in series to the first and second main coil portions 221 and 222 of the main coil 220 and the first and second auxiliary coil parts 231 and 232 of the auxiliary coil 230, respectively. The capacitor 245 may lower the high voltage across the auxiliary coil 230 which may occur during resonance. At this time, the capacitance of the capacitor 245 may be determined in consideration of the resonance frequency.

Figure 10:
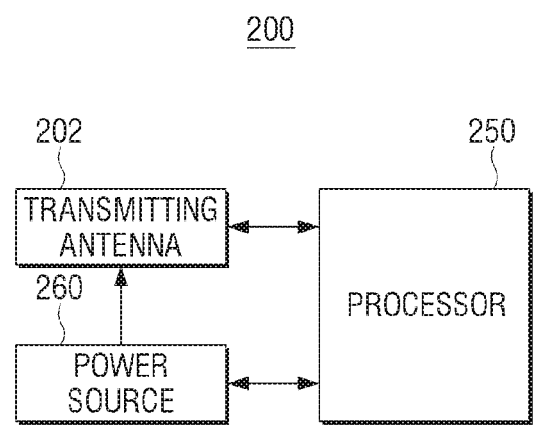
FIG. 10 is a block diagram illustrating a wireless power transmitter using a wireless power transceiver according to an embodiment as a transmitting antenna.

FIG. 10 is a block diagram illustrating a wireless power transmitter using a wireless power transceiver according to an embodiment as a transmitting antenna.

Referring to FIG. 10, a wireless power transmitter 200 may include a transmitting antenna 202, a power source 260, and a processor 250.

The transmitting antenna 202 may be formed to generate a magnetic field when a current is applied to the transmitting antenna 202. The transmitting antenna 202 may be configured to generate the magnetic field in a direction in which the wireless power receiver 100 is located. The transmitting antenna 202 according to an embodiment may include the main coil 220 and the auxiliary coil 230 that generate a magnetic field when a current is applied thereto. The structure of the transmitting antenna 202 may be the same as or similar to the structure of the above-described wireless power transceiver 201.

The power source 260 may be connected to the transmitting antenna 202 and supply a current. The power source 260 may include a power supply for supplying DC power, an inverter for converting the supplied DC power into AC power, and a driving IC for controlling the supply of current to the transmitting antenna 202. As described above, the power source 260 may supply AC power to the transmitting antenna 202.

The processor 250 may control the power source 260 and the transmitting antenna 202. For example, the processor 250 may control the power source 260 to supply a current to the transmitting antenna 202.

Hereinafter, the results of simulation of the magnetic force lines of the magnetic field of the wireless power transceiver 201 having the auxiliary coil 230 according to an embodiment used as an transmitting antenna and the magnetic force lines of the magnetic field of a conventional transmitting antenna without the auxiliary coil 230 will be described with reference to FIGS. 11 and 12.

Figure 11:
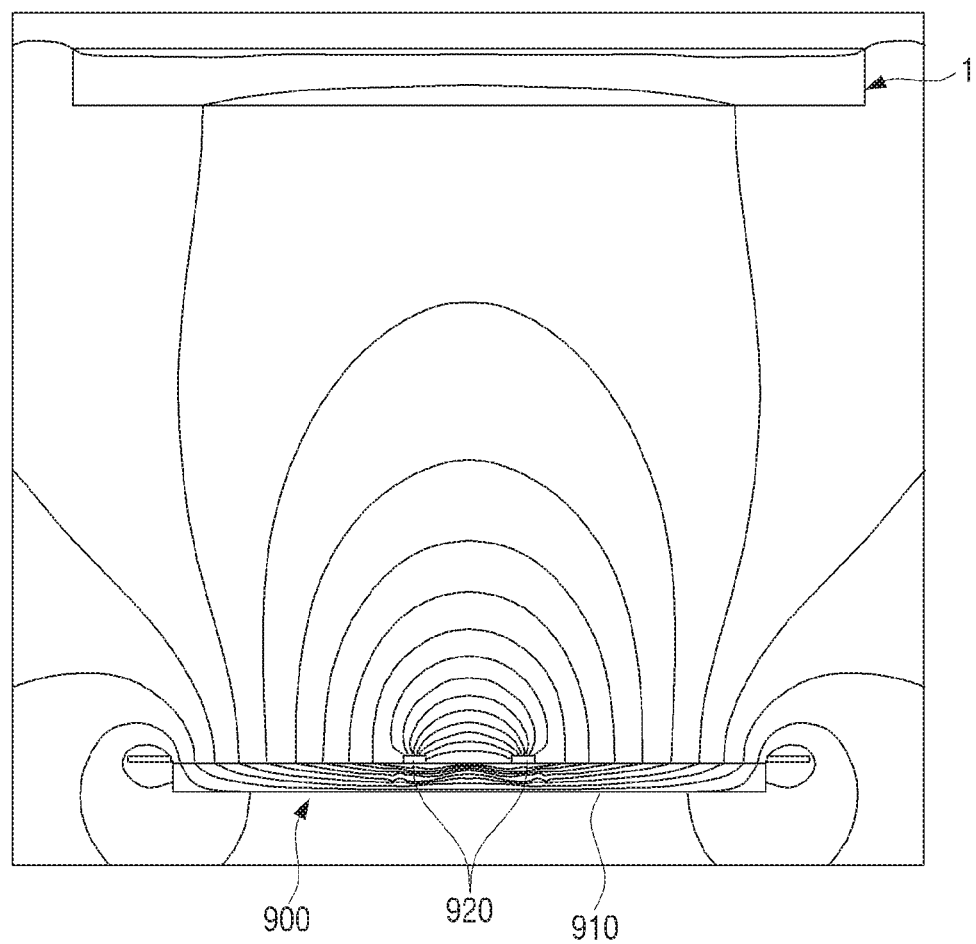
FIG. 11 is a diagram illustrating a simulation of a magnetic field of a wireless power transmitter having only a main coil.
Figure 12:
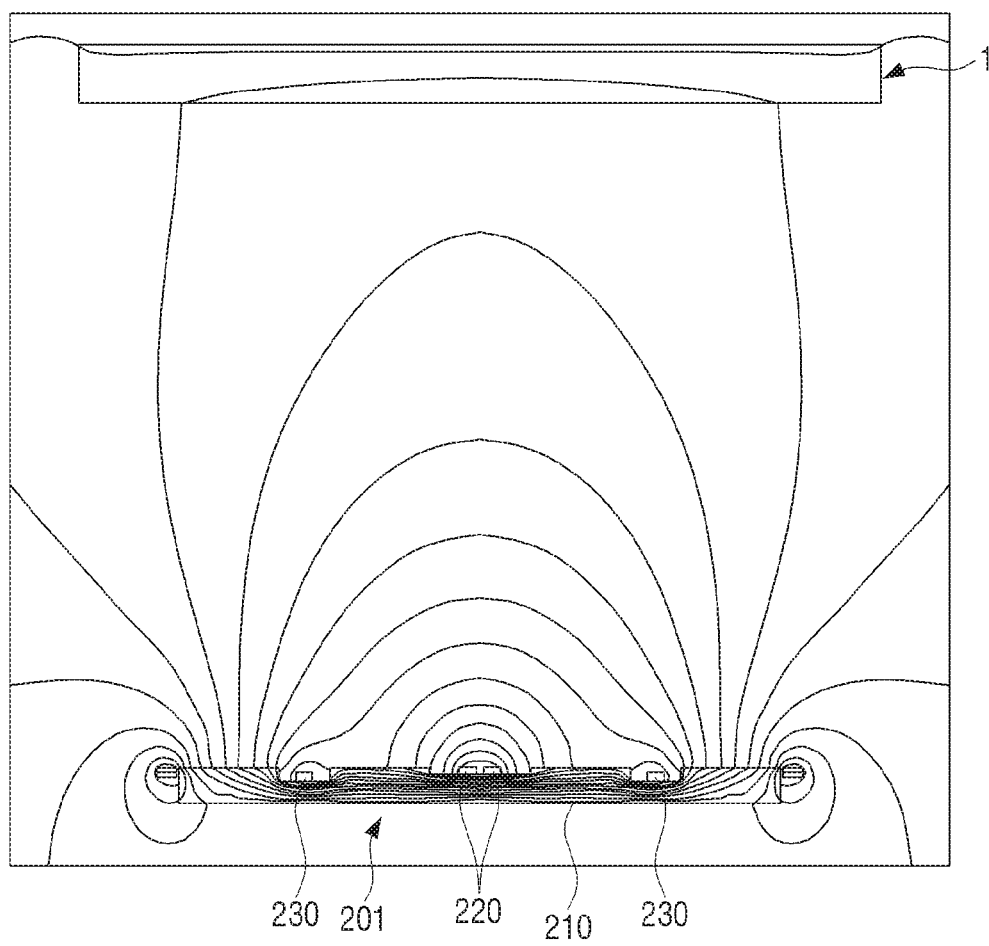
FIG. 12 is a diagram illustrating a simulation of a magnetic field of a wireless power transmitter according to an embodiment including a main coil and auxiliary coil.

FIG. 11 is a diagram illustrating a simulation of a magnetic field of a wireless power transmitter having only a main coil, and FIG. 12 is a diagram illustrating a simulation of a magnetic field of a wireless power transmitter including a main coil and an auxiliary coil according to an embodiment.

The transmitting antenna 202 according to an embodiment in which the main coil 220 is located in the middle of the magnetic body 210 and two auxiliary coils 230 on the left and right sides of the main coil 220 as illustrated in FIG. 12 may further transmit a magnetic field to the receiving antenna 101 compared with the conventional transmitting antenna 900 in which only a main coil 920 is located in the middle of a magnetic body 910 as illustrated in FIG. 11. Therefore, in the case of the transmitting antenna 202 according to an embodiment, the receiving antenna 101 may be disposed farther than the conventional transmitting antenna 900.

As illustrated in FIG. 11, in the conventional transmitting antenna 900, the magnetic flux is concentrated in the middle portion of the magnetic body 910, and the magnetic body 910 has one portion where the magnetic flux density is higher. However, in the transmitting antenna 202 according to an embodiment as illustrated in FIG. 12, a portion having a high magnetic flux density is dispersed into three portions of the magnetic body 210 by one main coil 220 and two auxiliary coils 230. Therefore, the transmitting antenna 202 according to an embodiment may significantly reduce loss of the magnetic body 210 as compared with the conventional transmitting antenna 900 in which the magnetic flux is concentrated in one portion.

In conclusion, in the transmitting antenna 202 having the main coil 220 and the two auxiliary coils 230 according to an embodiment, the portion where the magnetic flux density is higher is dispersed into three places, so that the generated magnetic field may be transmitted farther and the loss of the magnetic body 210 may be reduced or minimized. Accordingly, the transmitting antenna 202 according to an embodiment may have higher performance in terms of efficiency and distance as compared with the conventional transmitting antenna 900.

In the case of the above-described embodiment of the wireless power transceiver 201, the auxiliary coil 230 may be formed of two auxiliary coil parts, that is, the first auxiliary coil part 231 and the second auxiliary coil part 232. However, embodiments are not limited thereto.

Figure 13:
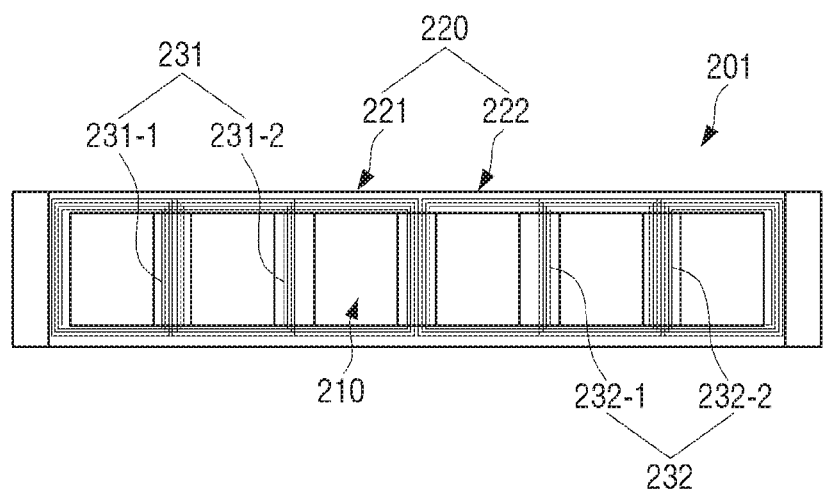
FIG. 13 is a plan view illustrating a modification of a wireless power transceiver according to an embodiment.

For example, the auxiliary coil 230 of the wireless power transceiver 201 may include four auxiliary coil parts. In other words, each of the first auxiliary coil part 231 and the second auxiliary coil part 232 may include at least two sub auxiliary coil parts. FIG. 13 illustrates an example where each of the first auxiliary coil part 231 and the second auxiliary coil part 232 includes two sub auxiliary coil parts.

Referring to FIG. 13, the first auxiliary coil part 231 located between the first main coil portion 221 and the magnetic body 210 includes two sub auxiliary coil parts 231-1 and 231-2. Further, the second auxiliary coil part 232 located between the second main coil portion 222 and the magnetic body 210 includes two sub auxiliary coil parts 232-1 and 232-2.

When each of the first auxiliary coil part 231 and the second auxiliary coil part 232 is configured to include two or more sub auxiliary coil parts 231-1, 231-2, 232-1, and 232-2 as described above, the magnetic body 210 has the high magnetic flux density in five or more places, so that the loss of the magnetic body 210 may be further reduced and the magnetic force lines may be transmitted farther.

According to an embodiment, the main coil 220 and the auxiliary coil 230 may be physically connected to each other. However, the main coil 220 and the auxiliary coil 230 may not be physically connected, but may be formed separately. In this case, the first main coil portion 221 and the second main coil portion 222, which form the main coil 220, may be connected to each other, and the first auxiliary coil part 231 and the second auxiliary coil part 232, which form the auxiliary coil 230, may be connected to each other. At this time, the main coil 220 and the auxiliary coil 230 may be spaced apart from each other by a predetermined distance in the vertical direction to be more strongly coupled with each other by a magnetic field.

Hereinafter, a display system including the wireless power transceiver 1 according to an embodiment will be described with reference to the drawings.

Figure 14:
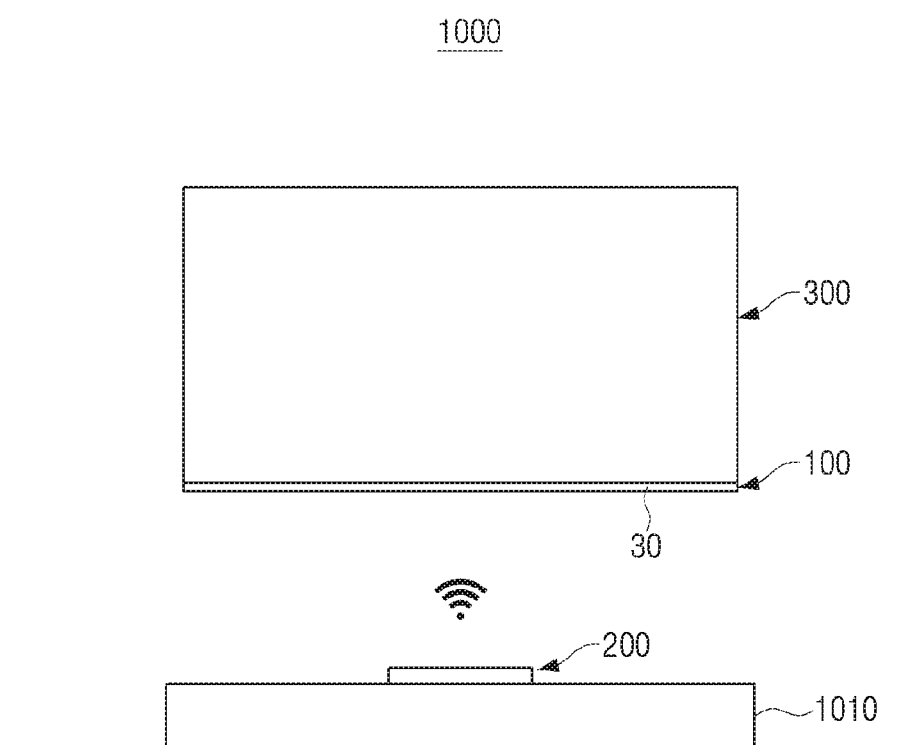
FIG. 14 is a view illustrating a display system including a wireless power transceiver according to an embodiment.
Figure 15:
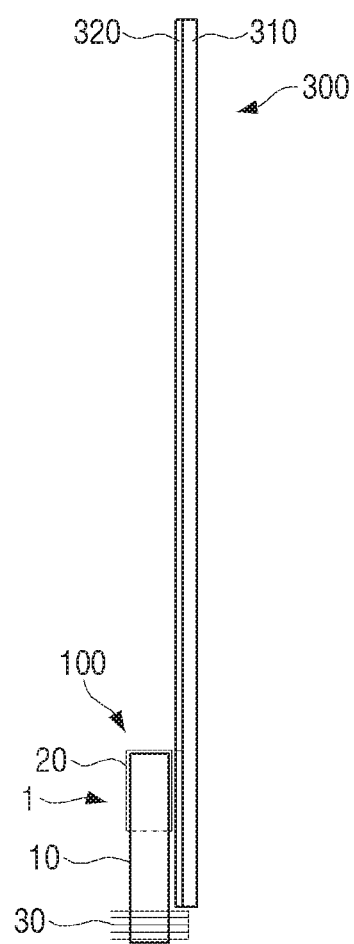
FIG. 15 is a side view illustrating an example where a dual coil of a wireless power transceiver according to an embodiment is disposed at a lower end of a display apparatus.

FIG. 14 is a view illustrating a display system including a wireless power transceiver according to an embodiment. FIG. 15 is a side view illustrating a case where a dual coil of a wireless power transceiver according to an embodiment is disposed at a lower end of a display apparatus.

Referring to FIG. 14, a display system 1000 may include a wireless power receiver 100, a wireless power transmitter 200, and a display apparatus 300 to receive power from the wireless power receiver 100.

The display apparatus 300 may be configured to receive power from the wireless power receiver 100 by a wire.

The wireless power transmitter 200 may be implemented by a set-top box having a lower height or a sound-bar, and the wireless power receiver 100 may be disposed in the display apparatus 300.

The wireless power transmitter 200 and the wireless power receiver 100 may be disposed apart from each other in the vertical direction. The wireless power transmitter 200 may be configured to generate a magnetic field in a direction in which the wireless power receiver 100 is located.

The wireless power receiver 100 may be disposed at the lower end of the display apparatus 300. However, the position of the wireless power receiver 100 is not limited thereto. For example, the wireless power receiver 100 may be disposed on the rear surface of the display apparatus 300 to not be visible to a user viewing the front side of the display apparatus 300.

FIGS. 14 and 15 illustrate an example where the wireless power transmitter 200 is disposed at a certain distance below the display apparatus 300 and the wireless power receiver 100 is disposed at the lower end of the display apparatus 300.

The wireless power transmitter 200 may be provided integrally with a set-top box located on the top of a cabinet 1010 disposed in the room. The wireless power transmitter 200 may use the wireless power transceiver 201 as illustrated in FIGS. 8 and 9 as a transmitting antenna.

The wireless power receiver 100 may be disposed such that a part of the wireless power receiver 100 is exposed under the lower bezel of the display apparatus 300. In this case, the wireless power receiver 100 uses the wireless power transceiver 1 as illustrated in FIGS. 1 to 3, in which the dual coil 30 is wound in a spiral shape, as a receiving antenna. At this time, as illustrated in FIG. 15, the wireless power receiver 100 is disposed such that one side surface of the dual coil 30 is exposed to the front side of the display apparatus 300 below the lower end of the lower bezel of the display apparatus 300. In other words, the wireless power transceiver 1 may be disposed so that one surface of the dual coil 30 is visible in front of the display apparatus 300. In order to reduce or minimize the thickness of the display apparatus 300, the magnetic body 10 may be brought into close contact with the rear surface of the display apparatus 300.

When the dual coil 30 of the wireless power receiver 100 is positioned at the lower end of the display apparatus 300, the magnetic force lines induced in the wireless power transmitter 200 are not blocked by a metal plate such as the rear chassis 320 provided on the rear surface of the display apparatus 300, and may directly pass through the dual coil 30 and the solenoid coil 20 of the wireless power receiver 100, thereby generating a current.

In detail, in the solenoid coil 20, a current may be induced by a magnetic field component passing through the wireless power receiver 100 in a horizontal direction. In the dual coil 30 which is disposed substantially perpendicular to the solenoid coil 20 and is wound in a direction opposite to each other below the solenoid coil 20, a current may be induced by a magnetic field component passing through the wireless power receiver 100 in a vertical direction.

On the other hand, in the case where both speakers of the display apparatus 300 that emit sound in the downward direction are disposed at the left and right ends of the lower end of the display apparatus 300, the length of the wireless power receiver 100, that is, the length of the magnetic body 10 of the receiving antenna 101 may be shortened due to the speakers. If the length of the wireless power receiver 100, that is, the length of the receiving antenna 101 is shortened, the distance at which power may be received may be shortened.

When it is necessary to dispose the left and right speakers of the display apparatus 300 on the left and right sides of the wireless power receiver 100, the magnetic body may be provided with sound passage holes through which sound can pass.

Figure 16:
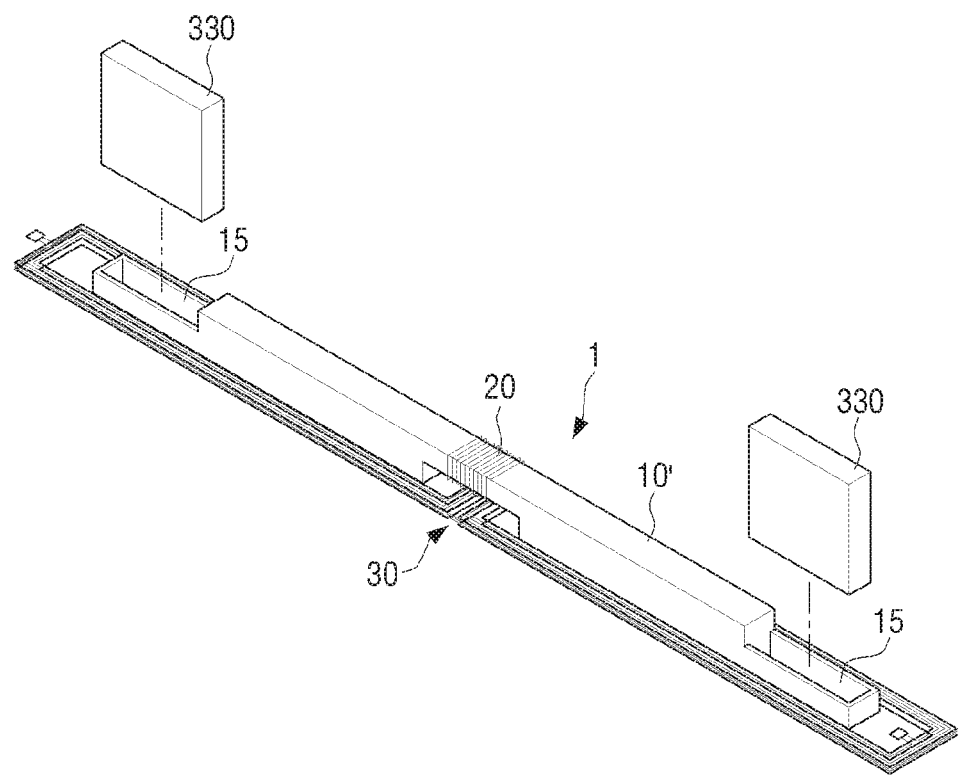
FIG. 16 is a perspective view illustrating a wireless power transceiver according to an embodiment in which sound passage holes are provided.

FIG. 16 is a perspective view illustrating a wireless power transceiver according to an embodiment in which sound passage holes are provided.

Referring to FIG. 16, two sound passage holes 15 corresponding to the left and right speakers 330 of the display apparatus 300 are provided at both ends of the magnetic body 10' of the wireless power transceiver 1. The sound passage holes 15 may be formed in a shape and size corresponding to a part of the speaker 330 through which the sound is discharged. Therefore, the sound emitted from the speakers 330 may be emitted to the lower side of the display apparatus 300 through the sound passage holes 15 of the magnetic body 10'. As described above, when the sound passage holes 15 through which the sound emitted from the speakers 330 passes are provided in the magnetic body 210, the length of the magnetic body 210 may be increased or maximized, so that the reduction of the magnetic force may be reduced or minimized.

Figure 17:
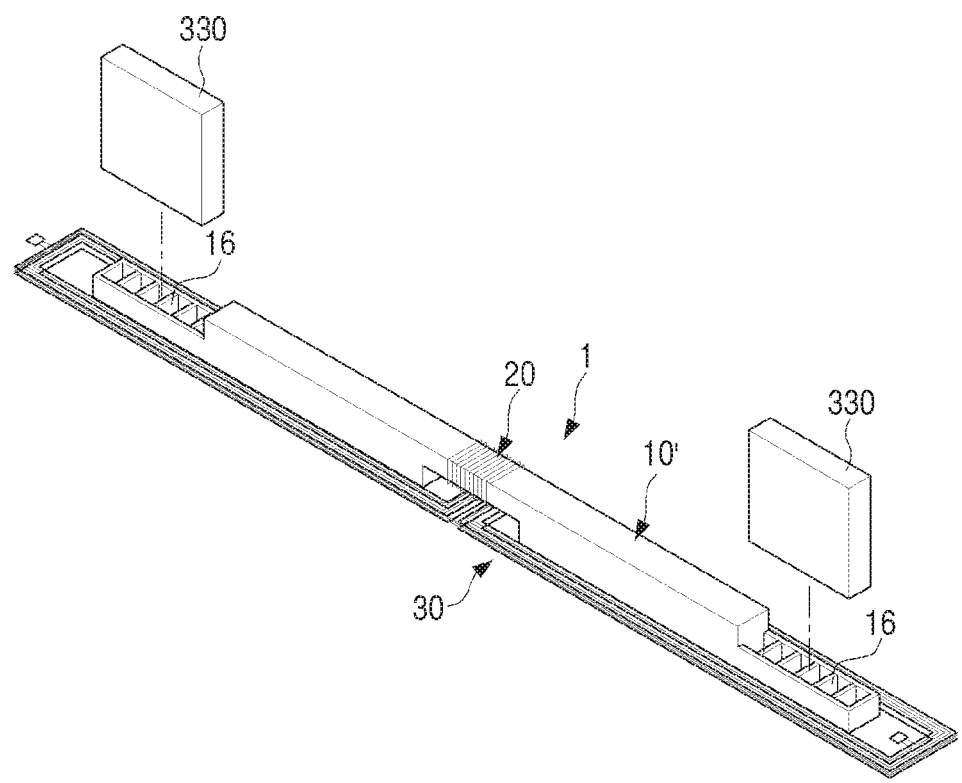
FIG. 17 is a perspective view illustrating a wireless power transceiver according to an embodiment in which sound passage holes of an example are provided.

FIG. 17 is a perspective view illustrating a wireless power transceiver according to an embodiment in which sound passage holes of another example are provided.

Referring to FIG. 17, two sound passage holes 16 corresponding to the left and right speakers 330 of the display apparatus 300 may be provided at both ends of the magnetic body 10' of the wireless power transceiver 1. The sound passage holes 16 according to an embodiment includes a plurality of slits formed in a portion corresponding to a part of the speaker 330 through which the sound is discharged. Therefore, the sound emitted from the speaker 330 of the display apparatus 300 may be emitted to the lower side of the display apparatus 300 through the plurality of slits of the sound passage holes 16. As described above, when the sound passage holes 16 of the magnetic body 10' is formed in the plurality of slits, the rigidity of the portion of the magnetic body 210 where the sound passage holes 16 are formed may be increased and the magnetic force reduction may be reduced or minimized.

As another example, the wireless power transceiver 1 according to an embodiment may be disposed on the rear surface of the display apparatus 300 to not be visible from the front of the display apparatus 300.

Figure 18:
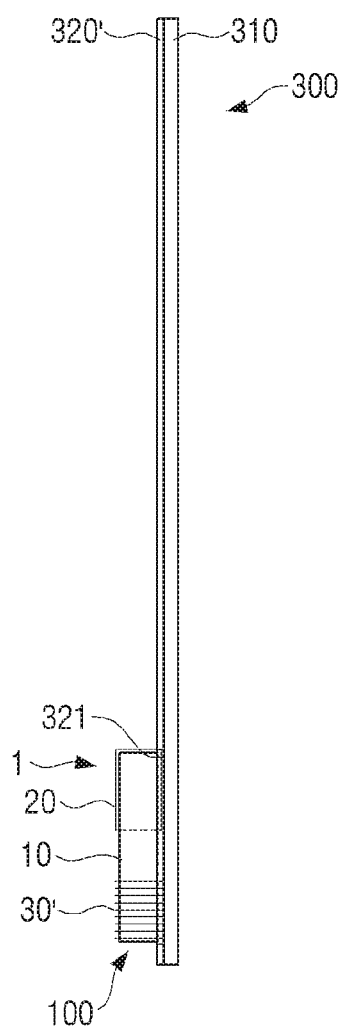
FIG. 18 is a view illustrating an example where a dual coil of a wireless power transceiver according to an embodiment is disposed on a rear surface of a display apparatus.
Figure 19:
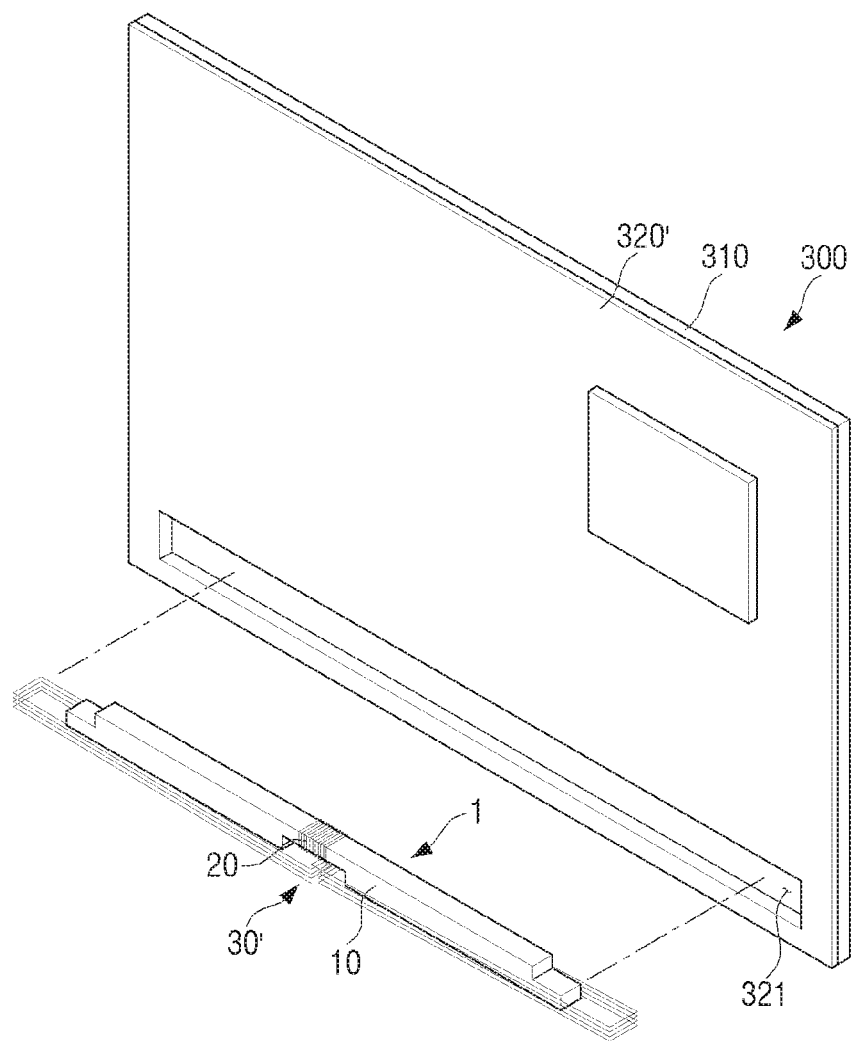
FIG. 19 is an exploded perspective view illustrating a state where a wireless power transceiver according to an embodiment is separated from a rear surface of a display apparatus.

FIG. 18 is a view illustrating an example where a dual coil of a wireless power transceiver according to an embodiment is disposed on a rear surface of a display apparatus, and FIG. 19 is an exploded perspective view illustrating an example where a wireless power transceiver according to an embodiment is separated from a rear surface of a display apparatus.

Referring to FIGS. 18 and 19, the wireless power receiver 100 is disposed on the rear surface of the display apparatus 300. Therefore, the wireless power receiver 100 is not exposed to the front side of the display apparatus 300, and thus the user located in front of the display apparatus 300 may not see the wireless power receiver 100. In this case, the wireless power receiver 100 uses the wireless power transceiver 1 as illustrated in FIGS. 4 and 5, in which the dual coil 30' is wound in a helical shape, as a receiving antenna 101.

When the dual coil 30' is disposed on the rear surface of the display apparatus 300, the magnetic force lines transmitted from the wireless power transmitter 200 may be blocked by a metal plate such as a rear chassis 320 provided on the rear surface of the display apparatus 300 and supporting the display panel 310, and the wireless power receiver 100 may not receive power. In order to receive power, a portion of the metal plate 320 where the wireless power receiver 100 is disposed may be cut to form an installation opening 321. Thus, the magnetic force lines generated in the wireless power transmitter 200 may penetrate the display panel 310 and may be received by the wireless power receiver 100. In other words, the magnetic force lines generated in the wireless power transmitter 200 may pass through the dual coil 30' and the solenoid coil 20 of the wireless power receiver 100 directly through the display panel 310 and the installation opening 321, thereby generating a current.

In FIG. 19, the receiving antenna 101 of the wireless power receiver 100 is located at the installation opening 321 of the display apparatus 300. However, the installation opening 321 may be filled with a material through which the magnetic force lines may pass. For example, the installation opening 321 may be closed with a plastic through which magnetic force lines may pass. When the installation opening 321 is closed with the material through which the magnetic force lines pass as described above, the rigidity of the metal plate 320 supporting the display panel 310 may be reinforced.

According to an embodiment, the entire portion of the wireless power transceiver 1 may be disposed in the display apparatus 300. However, embodiments are not limited thereto. As another example, a part of the wireless power transceiver 1 may be disposed in the display apparatus 300 and the other part may be disposed in a sound bar.

Figure 20:
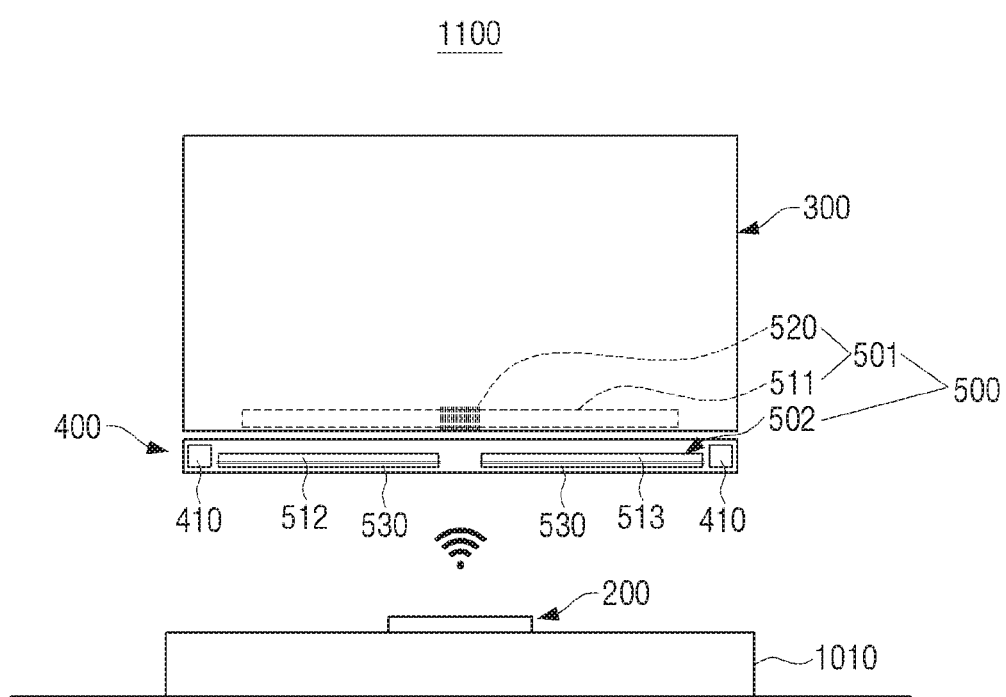
FIG. 20 is a view illustrating a display system including a wireless power transceiver according to an embodiment.
Figure 21:
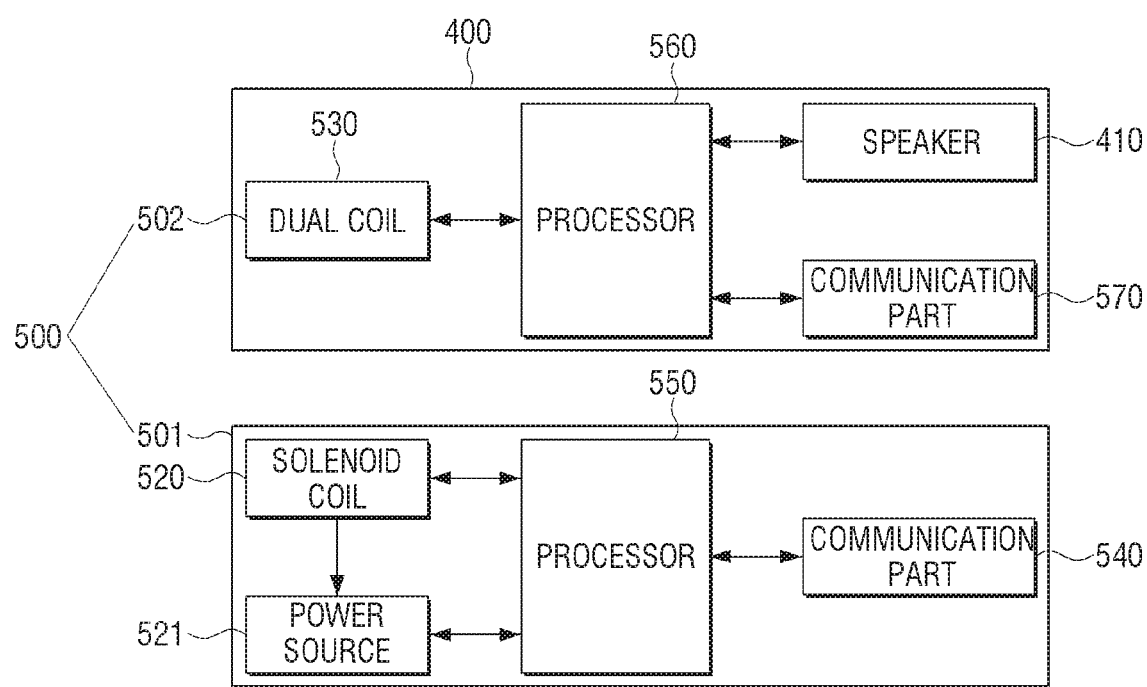
FIG. 21 is a block diagram illustrating a wireless power receiver according to an embodiment.

FIG. 20 is a view illustrating a display system including a wireless power transceiver according to an embodiment. FIG. 21 is a block diagram illustrating a wireless power receiver according to an embodiment, which is applied to the display system of FIG. 20.

Referring to FIGS. 20 and 21, a display system 1100 according to an embodiment may include a wireless power transmitter 200, a wireless power receiver 500, a sound bar 400, and a display apparatus 300.

The wireless power transmitter 200 may be implemented as a set-top box having a relatively low height or a sound bar. A part of the wireless power receiver 500 may be disposed in the display apparatus 300 and the other part of the wireless power receiver 500 may be disposed in the sound bar 400.

The wireless power transmitter 200 and the wireless power receiver 500 may be disposed apart from each other in the vertical direction. The wireless power transmitter 200 may generate a magnetic field toward the sound bar 400 in which the wireless power receiver 500 is located. Accordingly, the wireless power transmitter 200 may be implemented as a set-top box disposed on the cabinet 1010 below the display apparatus 300.

The sound bar 400 may be disposed adjacent to the display apparatus 300 below the display apparatus 300. The sound bar 400 may be configured to receive a sound signal from the display apparatus 300 wirelessly and to output a sound.

The wireless power receiver 500 may be formed in a structure in which the solenoid coil 20 and the dual coil 30 are provided in separated magnetic bodies as the wireless power transceiver 1 as illustrated in FIG. 6.

A solenoid coil part 501 in which the solenoid coil 520 is wound around a first magnetic body 511 may be disposed at the lower portion of the rear surface of the display apparatus 300. For example, the solenoid coil 520 wound around the first magnetic body 511 may be disposed at the lower end of the display apparatus 300 to be adjacent to the sound bar 400. Both ends of the solenoid coil 520 may be connected to a rectifier of a power source 521. The power source 521 of the solenoid coil part 501 may convert the AC current generated in the solenoid coil 20 into a DC current and supply the DC current to the display apparatus 300.

Referring to FIG. 21, a processor 550 of the solenoid coil part 501 may control the components of the solenoid coil part 501. For example, the processor 550 may control the power source 521 to rectify the current applied to the solenoid coil 520 and to transmit the rectified current to an external device. Further, the processor 550 may control a communication part 540 to transmit the sound signal received from the display apparatus 300 to the sound bar 400.

A dual coil part 502 in which the dual coil 530 is wound around the second magnetic body 512 and the third magnetic body 513 may be disposed in the sound bar 400. Accordingly, the magnetic force lines induced in the wireless power transmitter 200 may be amplified by the dual coil 530 disposed in the sound bar 400, and may induce the solenoid coil 520 disposed on the rear surface of the display apparatus 300, thereby generating a current. Then, in the solenoid coil 20, a current to which the current generated by the dual coil 30 combined may be induced.

Referring to FIG. 21, the sound bar 400 including the dual coil part 502 of the wireless power receiver 500 may include the dual coil 530, a speaker 410, a communication part 570, and a processor 560.

The dual coil 530 may amplify the magnetic field applied by the wireless power transmitter 200 and transmit the amplified magnetic field to the solenoid coil 520 disposed in the display apparatus 300. In other words, the dual coil 530 may operate as a repeater coil. The dual coil 530 may be configured so the magnetic field transmitted from the wireless power transmitter 200 passes through the dual coil 530. In addition, the dual coil 530 may be wound around the second magnetic body 512 and the third magnetic body 513 which are formed in a rod shape having a narrow width and a long length depending on the shape of the sound bar 400.

The dual coil 530 may be formed to be the same as or similar to the dual coil 30 of the wireless power transceiver 1 according to an embodiment as illustrated in FIGS. 1 to 3.

The speaker 410 is formed to output the sound signal received from the solenoid coil part 501 of the display apparatus 300. For example, the speakers 410 may be disposed on the left and right of the dual coil 530 to output the sound signal.

The communication part 570 is configured to communicate with an external device. For example, the communication part 570 may receive the sound signal to be output by the speaker 410 through the communication part 540 of the solenoid coil part 501.

The processor 560 may control the communication part 570 to receive the sound signal from the solenoid coil part 501, and may control the speaker 410 to output the sound signal of the display apparatus 300 received from the solenoid coil part 501.

When the wireless power receiver 500 is divided into two parts, the solenoid coil part 501 may be disposed in the display apparatus 300, and the dual coil part 502 may be disposed in the sound bar 400 as described above, the components of the wireless power receiver 500 disposed in the display apparatus 300 may be reduced or minimized, so a thinner display apparatus 300 may be manufactured.

While embodiments have been shown and described, it will be understood by those skilled in the art that various changes in form and details may be made therein without departing from the spirit and scope of the present disclosure as defined by the appended claims and their equivalents.

What is claimed is:

1. A wireless power transceiver comprising:
a magnetic body;
a solenoid coil wound with respect to the magnetic body; and
a dual coil spaced downwardly from the solenoid coil and wound with respect to the magnetic body on opposite sides of the solenoid coil, the dual coil being wound in directions opposite to each other.

2. The wireless power transceiver of claim 1, wherein the dual coil comprises a first coil portion and a second coil portion, and a center line of the first coil portion and a center line of the second coil portion are substantially perpendicular to a center line of the solenoid coil.

3. The wireless power transceiver of claim 2, wherein the magnetic body is formed in a rod shape and having a groove provided in a middle portion of the magnetic body and two portions on opposite sides of the groove, and
wherein the solenoid coil is wound with respect to the groove of the magnetic body and the first coil portion and the second coil portion are wound with respect to the two portions of the magnetic body.

4. The wireless power transceiver of claim 1, wherein the solenoid coil and the dual coil are physically connected in series.

5. The wireless power transceiver of claim 1, wherein the solenoid coil and the dual coil are physically separated, and coupled to each other by a magnetic field.

6. The wireless power transceiver of claim 5, further comprising a power source connected to both ends of the solenoid coil,
wherein the dual coil is configured to operate as a repeater.

7. The wireless power transceiver of claim 5, further comprising a power source connected to both ends of the dual coil,
wherein the solenoid coil is configured to operate as a repeater.

8. The wireless power transceiver of claim 1, wherein the magnetic body comprises a groove and two legs on opposite sides of the groove, and the dual coil is wound around the two legs of the magnetic body, respectively, in a helical shape.

9. The wireless power transceiver of claim 1, wherein the magnetic body comprises a groove and two legs on opposite sides of the groove, and the dual coil is wound around the two legs of the magnetic body, respectively, in a spiral shape.

10. The wireless power transceiver of claim 9, wherein the dual coil comprises:
a plurality of spiral coil layers;
a plurality of insulators interposed between the plurality of spiral coil layers; and
a plurality of capacitors connected in series to the plurality of spiral coil layers.

* * * * *